(12) United States Patent
Mickelsen et al.

(10) Patent No.: US 9,918,144 B2
(45) Date of Patent: *Mar. 13, 2018

(54) ENCHANCED EXPERIENCE FROM STANDARD PROGRAM CONTENT

(71) Applicant: EchoStar Technologies L.L.C., Englewood, CO (US)

(72) Inventors: Jeremy Mickelsen, Denver, CO (US); Adam Schafer, Aurora, CO (US); Bradley Wolf, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,143

(22) Filed: Nov. 14, 2016

(65) Prior Publication Data
US 2017/0064414 A1 Mar. 2, 2017

Related U.S. Application Data

(63) Continuation of application No. 14/628,098, filed on Feb. 20, 2015, now Pat. No. 9,532,115, which is a
(Continued)

(51) Int. Cl.
| | | |
|---|---|---|
| *H04N 7/16* | (2011.01) |
| *H04N 21/8545* | (2011.01) |
| *H04N 5/04* | (2006.01) |
| *H04N 21/8547* | (2011.01) |
| *H04N 21/43* | (2011.01) |
| *H04N 21/41* | (2011.01) |
| *H04N 21/436* | (2011.01) |
| *H04N 21/233* | (2011.01) |
| *H04N 21/234* | (2011.01) |
| *H04N 21/242* | (2011.01) |
| *H04N 21/422* | (2011.01) |
| *H04N 21/85* | (2011.01) |

(52) U.S. Cl.
CPC .......... *H04N 21/8545* (2013.01); *H04N 5/04* (2013.01); *H04N 21/233* (2013.01); *H04N 21/23418* (2013.01); *H04N 21/242* (2013.01); *H04N 21/4126* (2013.01); *H04N 21/4131* (2013.01); *H04N 21/42202* (2013.01); *H04N 21/4307* (2013.01); *H04N 21/43615* (2013.01); *H04N 21/8547* (2013.01); *H04N 21/85* (2013.01)

(58) Field of Classification Search
None
See application file for complete search history.

(56) References Cited

U.S. PATENT DOCUMENTS

2007/0199035 A1* 8/2007 Schwartz ............... H04N 7/163
725/110
2008/0201731 A1 8/2008 Howcroft
(Continued)

*Primary Examiner* — Justin Shepard
(74) *Attorney, Agent, or Firm* — Seed IP Law Group LLP

(57) ABSTRACT

Methods and apparatus are disclosed for enhancing the viewing experience of video content by analyzing the content to determine where enhanced sensory experience events may be appropriate, by identifying devices at the viewing location and devices personal to the viewer that can be controlled to provide an enhanced sensory experience, and by activating those devices in a way that is synchronized with the presentation of the content.

20 Claims, 3 Drawing Sheets

Related U.S. Application Data continuation of application No. 13/802,173, filed on Mar. 13, 2013, now Pat. No. 8,984,568.

(56) References Cited

U.S. PATENT DOCUMENTS

| | | |
|---|---|---|
| 2009/0282452 A1 | 11/2009 | Wei |
| 2010/0125875 A1* | 5/2010 | Hays ................ H04N 7/17318 725/61 |
| 2011/0241908 A1* | 10/2011 | Han ....................... G08C 17/00 341/20 |
| 2012/0254907 A1 | 10/2012 | Serdiuk |
| 2014/0181193 A1 | 6/2014 | Narasimhan et al. |

* cited by examiner

ENCHANCED EXPERIENCE FROM STANDARD PROGRAM CONTENT

This application is a continuation of U.S. application Ser. No. 14/628,098, filed Feb. 20, 2015, which is a continuation of U.S. application Ser. No. 13/802,173, filed Mar. 13, 2013, now U.S. Pat. No. 8,984,568, all of which are incorporated herein by reference in their entirety.

BACKGROUND

Technical Field

The present disclosure relates to systems and methods to provide an enhanced sensory experience while viewing audio or video content by analyzing the content and sending commands to activate devices at the viewing location or devices personal to the viewer to provide special effects as the content is displayed.

Description of the Related Art

Watching a movie involves a viewer receiving sensory experiences: visual while watching the images on the presentation device, and auditory while listening to the sound coming through the speakers. The audio and video are typically synchronized so that the sensory experiences together enhance the viewing of the movie.

Limited attempts have been made in the past to enhance the sensory experience of viewing movies by adding special effects. For example, the Sensurround process was developed in the 1970s to enhance the audio experience during film showings by adding an extended range base for sound effects. The low-frequency sound was more felt than heard and provided a physical sensation while earthquakes, volcanic eruptions, natural disasters, and airline disasters were being viewed. Another example of enhanced sensory experience was included as part of some movies in the 1950s and 1960s that augmented the video and audio of the movie with physical special effects directed to the audience. One example of such devices was used in the movie "The Tingler," where vibrating motors attached to the undersides of theater seats were activated at key times during the film. For example, when a monster appeared to turn to attack the audience, the motors would be activated to vibrate the seats as a voice shouted at the audience to "scream for their lives."

These kind of enhanced sensory experiences, beyond simple video and audio, allow viewers to become more immersed and engaged in the movie action and plot. In the above examples, the timing of the enhanced sensory experience was either integrated into the movie sound track, or performed by theater operators who activated the enhanced sensory devices based on visual and audio cues while watching the movie.

BRIEF SUMMARY

A viewer of a movie, or other audiovisual content, may have a more immersive, impactful, and enhanced viewing experience if devices around the viewer were activated at appropriate times during the presentation to provide special effects. One embodiment of a system to accomplish this is disclosed that identifies devices available to provide special effects, either devices at the viewing location or devices personal to the viewer, and the effects these devices can produce. The system also analyzes the presentation content including metadata, text, video, and audio to determine special effects appropriate for the content, and sends commands to activate the devices to provide these effects synchronized with the presentation content.

DETAILED DESCRIPTION

In one embodiment, a system analyzes a video content stream, such as a movie, a television series, a documentary, news, music special or sporting event, to determine additional special effects that would enhance the content viewing experience. The video content stream may be delivered to the viewer though a cable television provider, by a satellite television provider, or through an Internet based streaming video provider. The viewer will be watching the video content stream on a display device, such as a television or a computer monitor. The system is configured to be aware of those devices at the viewing location or devices personal to a user that can be used to create a special effect to enhance the viewing experience of the content stream. For example, if a character in a movie opens a door and a burst of cold air comes through, the system is configured to activate a fan or air conditioner in the viewing location at the same time the character opens the door. Or, if a phone is about to ring in a television series episode, the viewer's cell phone is called and would also ring.

The video content stream includes audio and video as well as other data that can also be analyzed and evaluated by the system. The other types of data include but are not limited to metadata and text information such as closed-caption information, subtitles, and titles.

The system's analysis of the video content may include but is not limited to: reading metadata within the content stream; parsing closed-caption information, subtitles, or other text information in the stream; performing image analysis on the video frames or audio analysis on the sound track. The system uses this analyzed data to determine appropriate effects that would enhance the viewing experience. For example, effects include dimming lights at the viewing location, vibrating a viewer's phone, or other effects that would impact the viewer's environment as the viewer sees a particular scene on the display device.

In some embodiments the system is configured to identify and query the viewing environment and viewers to identify devices at the viewing location and those devices personal to the viewers that may be used by the system to create enhanced sensory effects. The effects are then matched up with the effects that could be produced by identified devices.

The activation of these devices can be coordinated as the content stream is being presented so that the viewer feels or experiences the effect at the same time that the viewer sees the content on the display device. Furthermore, these effects can be processed in real time and presented as the content is streaming, or the content can be preprocessed to identify the effects in advance so the activation of the devices to provide the enhanced experience is properly synchronized with the content.

Figure 1:
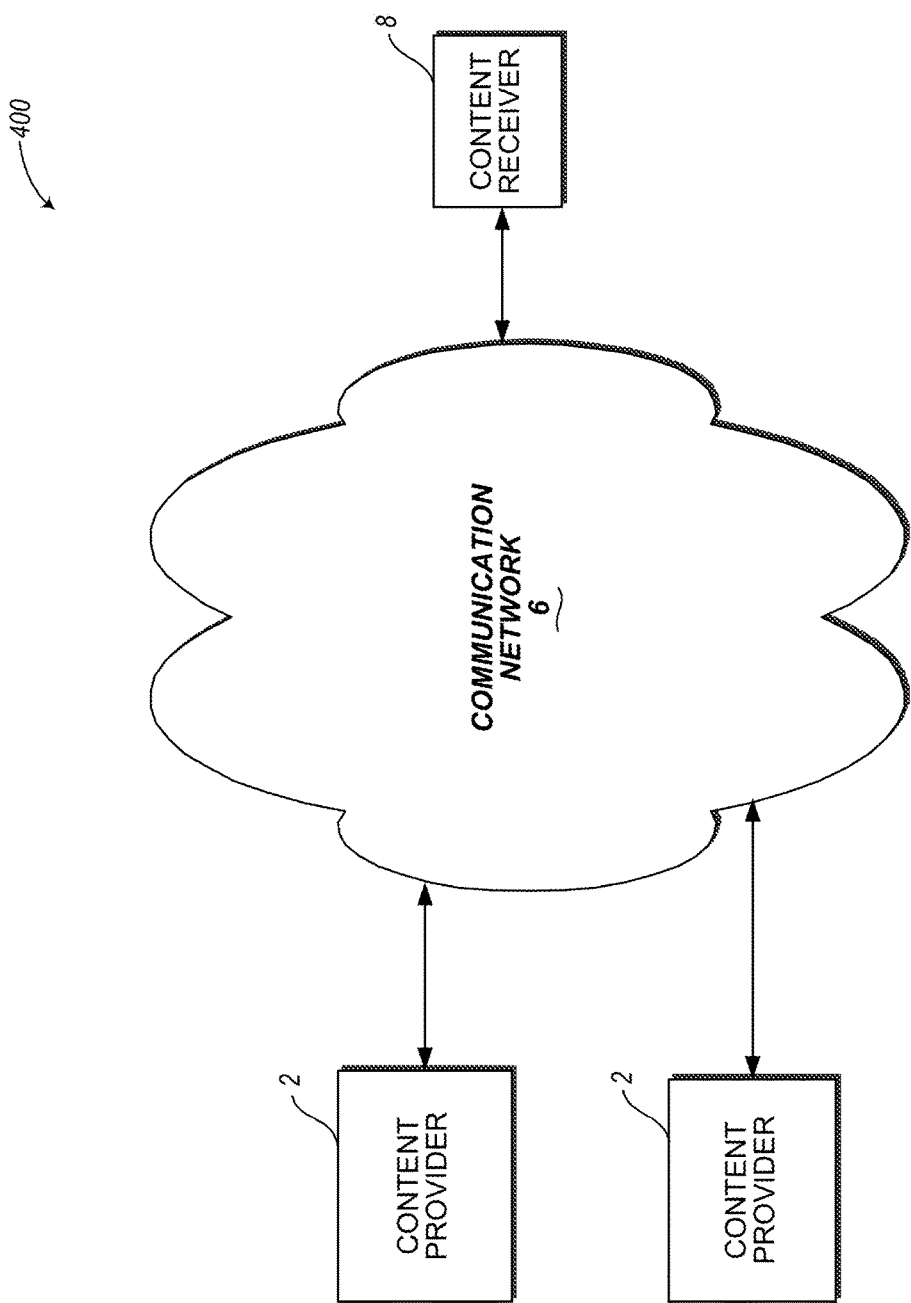
FIG. 1 is a context diagram describing content providers and content receivers.

Turning to FIG. 1, diagram 400 describes the relationship between content providers 2 and a content receiver 8. Content providers 2 create and distribute video content such as movies, television series, television specials, sports events, documentaries, musical events, and other types of content. Examples of content providers are ABC, NBC, CBS, HBO, Showtime, AMC, and the like. Content providers 2 make the content available through a communication network 6 which may include satellite systems, cable systems, Internet networks, or over-the-air broadcasting. This content is received by a content receiver 8, which may be a cable system box or satellite system set top box that is attached to a display device such as a television or other devices such as a video recorder. Some content receivers are able to record content for later viewing.

Figure 2:
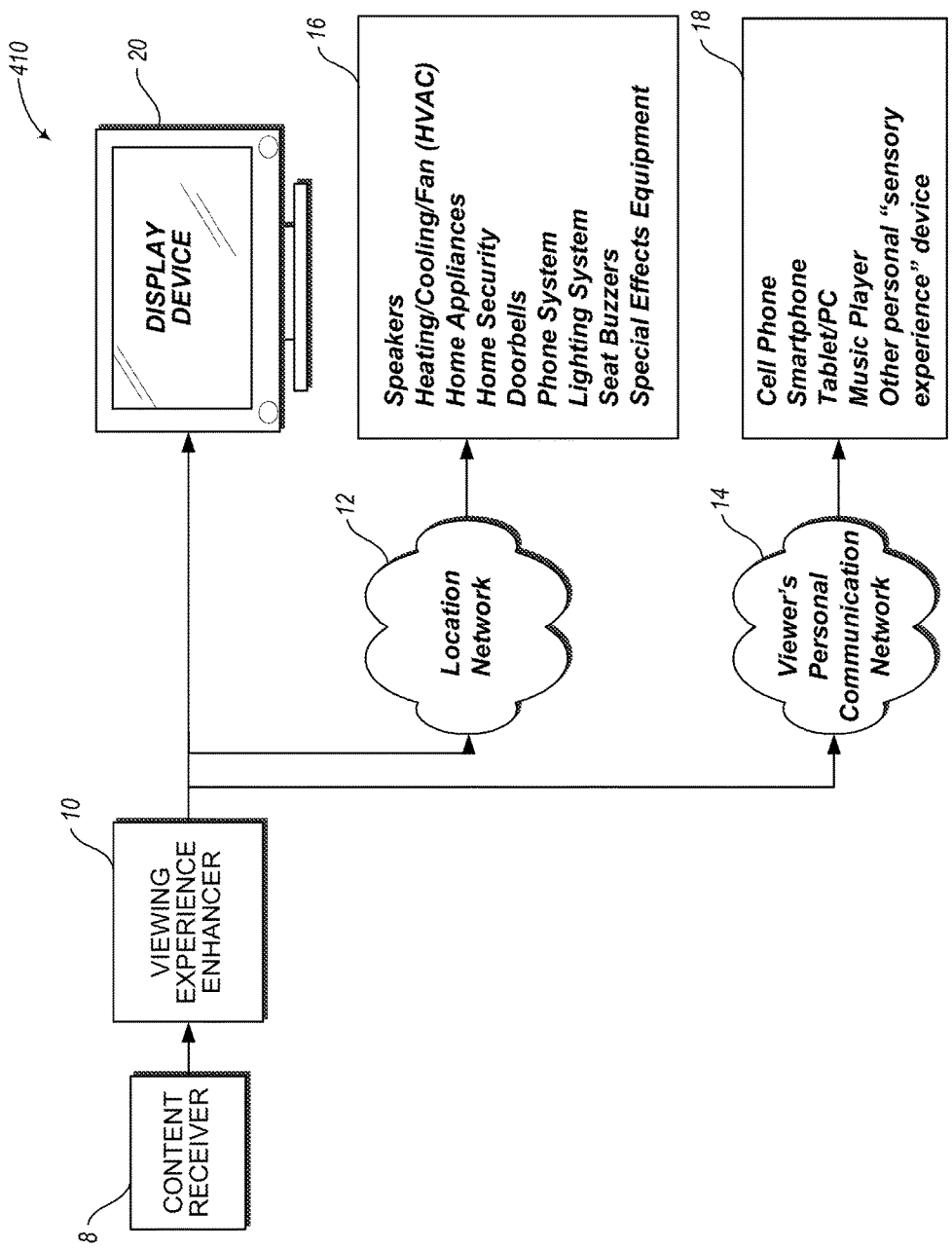
FIG. 2 shows an embodiment the relationship between a content receiver, a viewing experience enhancer and the presentation of content with devices supporting an enhanced viewing experience.

FIG. 2 shows diagram 410 as one example of the relationship between a content receiver 8 and the presentation of the content to the viewer on display device 20 that includes the enhanced viewing experience provided by devices 16 and 18. The content receiver 8 receives the video content stream such as movies, series, and entertainment specials and sends that to the viewing experience enhancer 10. In some embodiments, the viewing experience enhancer may be part of set top box which acts as content receiver 8, the viewing experience enhancer 10 may be housed as a separate system, or the viewing experience enhancer 10 may be integrated into display device 20. The output of the experience enhancer 10 includes the content stream which is sent to display device 20, as well as commands to devices 16 and 18 that, when activated, provide an enhanced user experience while the content stream is viewed.

These special effects devices that provide an enhanced sensory experience may be associated with a viewing location 16, or may be personal to a viewer 18.

A viewing location may include a movie theater, a home theater, a living room at a family residence, a television room at a campus dorm, or other room where people assemble to watch television. An example list of devices is shown in box 16, and includes speakers, heating systems, air conditioning systems, blowers, home appliances such as vacuums and blenders, home security, doorbells, phone systems, lighting system, and devices designed specifically to enhance sensory experiences for content which may include seat buzzers and wind machines. Other examples include aroma machines, strobe lights, haze machines, bubble machines, and the like. Theaters and home theaters may also include audio mixers, balancers, speakers and subwoofers, as well as special effects-specific devices such as fog machines, fans, strobe lights, color lights, dimmable lights, sound effect machines for providing sirens or thunder claps, bubble machines, haze machines, aroma machines, and cryo machines. Special effects devices may also include special seats for viewing content that include buzzers, heaters, coolers, vibrators, water features, or other stimulating devices. Devices within these seats may also include haptic technology which is a tactile feedback technology that takes advantage of a sense of touch by applying force vibrations or motions to a viewer in response to a viewer's actions. For example, if during a car racing sequence a user leans forward in a chair or grips a chair armrest more tightly, that may signal the device to provide more stimulation, such as harder seat vibration.

Viewing location devices within a building or home may also include curtains that open and shut, blinds that raise and lower, lights that turn on or off or dim, HVAC systems that can turn on blowers or raise and lower the temperature of a room, doorbells, exterior lights, burglar alarms that may provide noises or alerts, electric fireplaces, house phone systems, intercom systems, building or home computer control systems, entertainment systems that are not connected to the presentation video and audio system, personal computers or other related devices that have video, audio, or other sensory devices attached. Examples of household appliances include dishwashers, blenders, fans, hair dryers, microwave ovens, vacuum cleaners, and the like. Other appliances may include devices such as radio-controlled toys, robot devices, and input devices such as Microsoft Kinect.

Viewing location devices may be accessed by a location network 12 that in one or more embodiments are able to identify the devices within the location and determine how to operate those devices in various ways to achieve various effects. There are a number of ways these devices may be controlled. For example, some home systems integrate lighting, video, audio, set top box receivers, and special effects equipment into a single integrated system that is accessible through software interfaces. Devices may also be controlled through a number of different network technologies, such as Internet protocols, Bluetooth, Wi-Fi, radio-frequency, infrared, and wired building controller systems for automation using, for example, protocols such as ZigBee, RF4CE, Control4, DLNA, etc. In addition, an increasing number of homes are built for computer controlled devices which provide a way to identify and control individual appliances such as vacuums, blenders, hair driers, dishwashers, bread mixers, ovens, and the like from computers connected via the Internet.

Personal devices include those devices not connected to the location that the viewer brings to the location. Typically these devices are on the viewer's person, such as a cell phone in a pocket, or devices in very close proximity to the viewer such as a tablet in a backpack or purse. Examples of devices personal to the viewer are shown in block 18 and include a viewer's cell phone, smartphone, or tablet which can ring, buzz, play audio, display flashes of light, color, and text to the user; key fobs which can beep or buzz; gamer devices, such as force-feedback controllers that have integrated haptic technology; music players such as an iPod; viewing glasses such as Google glasses; hats; headphones; vests with sensors or stimulators; and the like.

These devices personal to a viewer may be accessed by the viewer's personal communication network 14 which in one or more embodiments may be able to identify the devices personal to a viewer and how to operate those devices in various ways to achieve various effects. This network may include WiFi, Bluetooth, or cell phone carrier networks.

Figure 3:
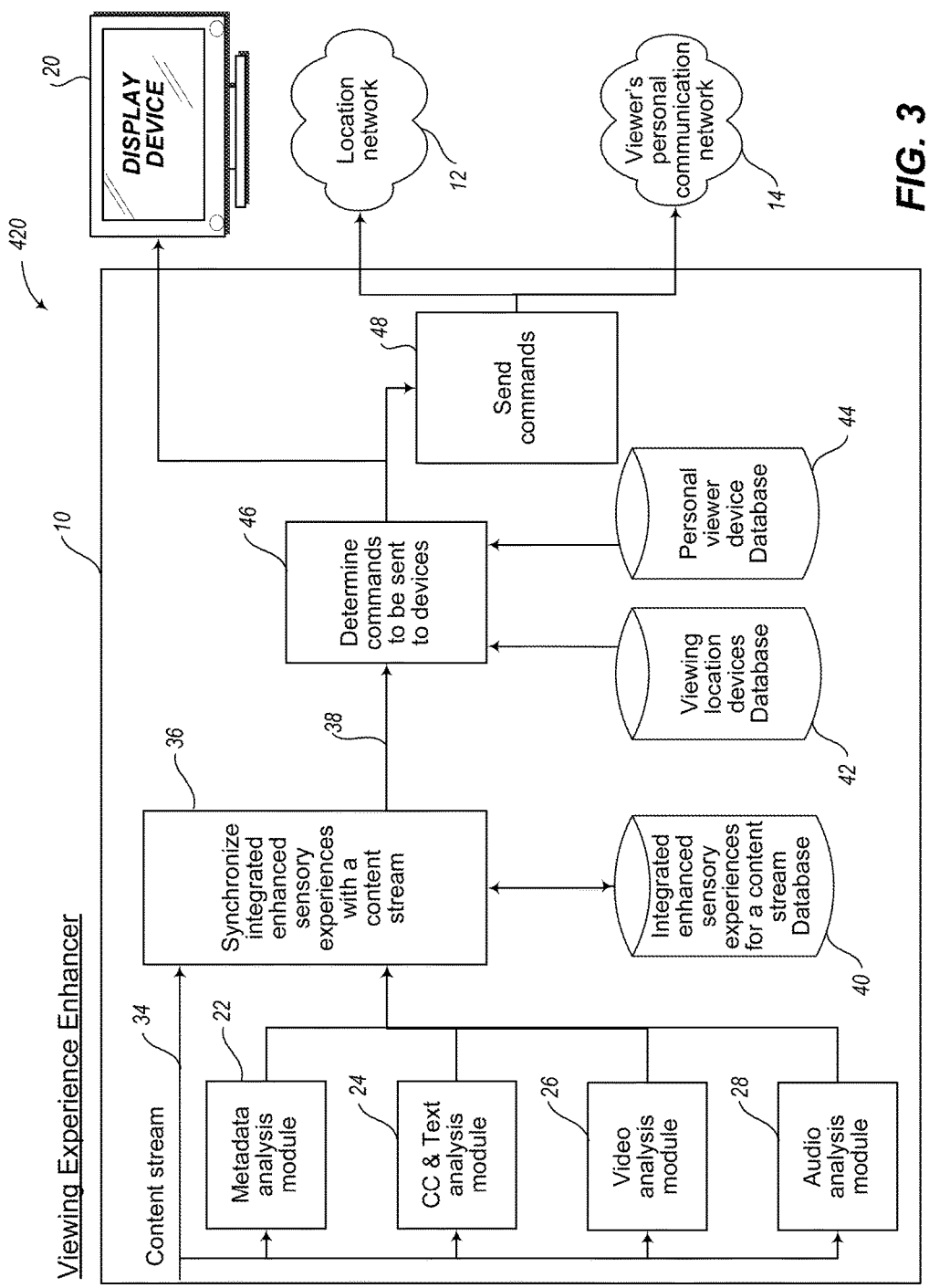
FIG. 3 shows a detailed diagram of one embodiment of a viewing experience enhancer.

FIG. 3 shows diagram 420, which is a detailed diagram of one embodiment of a viewing experience enhancer 10. The content stream enters the viewing experience enhancer at 34 which is processed by four different modules.

The first module, the metadata analysis module 22, analyzes the content stream for any metadata tags that describe enhanced sensory experiences to be used within the content. These metadata tags may be included in the video stream or in an associated data stream. For example, metadata tags may appear as escape codes within the closed captioning data of the content stream. In one embodiment, these tags may include enhanced sensory commands such as: darken room, ring doorbell, ring phone, vibrate seat, simulate to lightning flashes, produce fog for 120 seconds, lower temperature 5° in four minutes for 10 minutes then return temperature to normal, release a pine scent for 20 seconds, and the like. These commands would later be matched up with the identified location devices and personal devices available to be controlled during content presentation. In another embodiment, the metadata tags may include specific commands to be sent directly to the available identified devices.

The next module is the closed-caption and text analysis module 24. This module examines the content stream and extracts text information that may be used to identify enhanced sensory experiences for content events. For example, closed caption text includes dialogue text as well as any text-based background or context information that describes the presented scene, which may be in italics. A system to analyze and parse a human-readable tag would look for text clues, for example words such as "phone ringing", "gunshot", "doorbell", and "wind blowing".

Specifically, in closed-captioned audio/video presentations, the exact words that the person is speaking appears as typed text running across the screen at approximately the same time the words are spoken. For those movies which are closed-captioned, if there is a sound that is not spoken by an actor, the text for the sound will often be written on the screen so that a viewer who is deaf or listening with the sound turned off knows that a sound has occurred on the screen which affects the action but was not spoken. For example, if a person is sitting at the table talking to a friend, in the middle of which a doorbell rings, a closed-caption presentation will often have the words "doorbell ringing" written in italics in the middle of the spoken conversation, so that viewers, by reading the text alone, will recognize that a doorbell has rung in the middle of the person talking. Therefore, they can reasonably anticipate that the person will stand up and walk to the door, even though no other clues have been given other than the closed-captioned text of "doorbell ringing". Similar closed-captioned text occurs for other sounds, such as "phone ringing", to let the viewer know that even though the sound is not available, that the actors on the screen heard a phone ringing, which they may choose to ignore, and the fact that a phone was ringing and all the actors on the screen ignored the phone and did not answer it adds a key element to the drama.

According to this embodiment of the invention, the text is examined for content within the closed caption, and if text occurs which is not spoken by an actor but instead indicates an audio event only, then this is available to the viewing experience enhancer 10 for it to make a similar sound local to the viewer so they can experience the doorbell ringing, the phone ringing, the wind blowing, or some other event.

The purpose of the closed caption is for a person who cannot hear the dialogue, either because they are deaf, the sound is turned off, it is a different language, or for some other reason, and it is not its purpose to be analyzed for content and used to enhance the viewing experience. According to the present embodiment, this text which was provided for the purpose of reading by a user is used for a different purpose, to modify the local environment around a user to further enhance the viewing experience that is synchronized with the video pictures appearing on the screen.

The system may also analyze background notation describing sounds without visual cues such as "[thunder]" or "[footsteps]". The system would determine, based on the parsed data, those devices able to deliver the enhanced sensory experience associated with the event in the content stream.

Another example of text includes titling or subtitles. An algorithm parses and analyzes the presented text and in one embodiment looks for words or phrases that suggest an effect for an enhanced viewing experience. For example, the words "cold," "freezing," "chilly," "snowy," "Arctic," "sub zero temperature," and the like, would indicate that an enhanced user experience by lowering the temperature at the viewing location can be carried out. In another example, the words "sunset," "dark," "nighttime," and the like would indicate that an enhanced user experience by dimming the lighting at the location, closing a curtain, or playing nighttime sounds can be carried out. In another example, the words "someone at the door," "knocking," "ringing," and the like, would indicate someone at the door and would ring the doorbell at the location, or cause the viewer's smartphone device to make a doorbell ringing sound.

In another example, explicit text strings to indicate commands to a controller, either via a human-readable tag, or a "escape" character can be added to closed caption text. The system may be able to read closed-caption data prior to the time the closed-caption text is presented on the screen. This way, commands to devices may be built in advance into the content stream by scanning the closed-caption tags. This would allow commands to the devices to be sent with enough lead time so that the optimal effect from the device is properly synchronized when the content stream event is presented.

The Video analysis module 26 uses video analysis and graphics analysis techniques to determine whether to provide enhanced sensory experience events based on video indicators. This analysis determines cues based on the images portrayed or the type of change or rate of change of the images within the content stream. In one or more embodiments, individual frames are analyzed using pattern analysis and image recognition techniques to identify objects that suggest an enhanced sensory experience. For example, if the video analysis identifies a scene with snow or ice on the ground or on roofs of buildings, frosty breath, and actors bundled up, the system may determine that the temperature is cold and request the device controlling temperature at the viewing location to be turned down, causing the room to feel colder. If the analysis identifies sweating people, glowing hot objects, deserts, heat waves, or flames to indicate a hot temperature, commands may be sent to a device controlling temperature to turn the temperature up in the viewing location. Other examples include identifying fog on the screen, which would turn on a fog machine, or recognizing a person answering a cell phone, which may trigger a call to a viewer's cell phone.

In other embodiments, the changes between individual frames would be analyzed to determine whether certain sensory enhancements would be appropriate. For example, if the tropical scene described above only lasted for 15 seconds, then warming the viewing location may not be appropriate. In another example, if an outdoor scene got progressively darker, that may indicate a sunset which might call for the location lights to be dimmed or curtains closed. In addition, heuristics may be used to determine changes in screen brightness relative to the lighting levels in the room and send commands to devices to appropriately adjust room lighting during the day in a way different than would be adjusted during the night.

The video analysis module 26 looks at the visual content of the video to be presented, and performs a heuristic-type analysis of the video content in order to identify actions that can be carried out in the local environment of the viewer that can be synchronized with the events on the screen. For example, if the video content shows the lights in the room being turned off, as may happen just prior to a crime occurring in the movie, the video analysis module 26 will recognize the lights have suddenly gone from on to off on the screen, and in synchronism with the lights on the movie screen turning off, will turn off all the lights in the house, or in some cases just in the room of the display device. Similarly, the video content of the scene changes from stillness to wind blowing a flag or trees or other objects, then the fan in the local air conditioning system can be turned on in synchronism with the wind blowing, or some other local fan turned on, in order to simulate that the wind has started to blow.

These types of cues to provide an enhanced local viewing experience are obtained by examining the video frames of the content to be presented on the display screen. This video content may be in the form of traditional movie format with individual viewable frames, and the video analysis module examines the analogue data in the frames as they are to be presented, looking for visual cues that can be matched with a sensory experience adjacent the user. Alternatively, the video data stream may be in a digital format, such as an MPEG-type format which contains the video data digitally encoded. The data can be looked at in a digital form to determine the video which would show on the screen when a screen is driven according to the presented digital video format.

The audio analysis module 28 analyzes the audio stream looking for enhanced sensory experience events indicated by the type of audio and variations in the audio captured. In some embodiments this analysis may recognize specific sounds that are part of the audio stream, which would then be analyzed, or may identify other sounds that may describe the context of the scene. For example, a deep rumbling sound may call for a vibration in the viewer's chair to simulate an earthquake. Mysterious music, ticking sounds, or even extended periods of silence may indicate a mood of building suspense that may call for a clock to tick loudly, which sound can come from a local cell phone, ringing a doorbell, ringing a cell phone, or turning on a blender or hairdryer to startle the viewers and enhance their overall content viewing experience.

The output of these four modules is sent to the synchronized integrated enhanced sensory experience with a content stream module 36. This module first takes the enhanced sensory experience events from each module and using combination techniques creates an integrated enhanced sensory experience set for selected events in the content stream. These combination techniques may range in one or more embodiments from simply combining the events from each module to giving different weights to events from each module to determine the final set of integrated events that determine the integrated enhanced sensing experience for the content stream. Module 36 then synchronizes these final integrated events with the scenes in the content stream and outputs the content stream containing the synchronized integrated enhanced sensory experiences.

Content stream analysis may be done entirely in advance to determine appropriate device commands that can be synchronized with the content for later presentation, or the content presentation delayed to allow content stream analysis so that commands can be sent to devices such that the devices for effect synchronized with the associated video event. For example, the effect of turning lights on and off or ringing a doorbell may be done nearly instantly when the command is issued, whereas changing temperature or introducing fog would require the command to be given with more advanced time for the viewer to experience the effect at the right time. In one embodiment, the system not only identifies the individual devices available to it, the effects that the device can produce, and the commands needed to control the device, but also understands the lead time for commands sent to each device such that the devices activate in the proper order.

In different embodiments, the synchronization of the enhanced experiences, providing visual, auditory, tactile, and/or smell sensations may be done in different ways to enhance the viewing experience, for example to create experiences similar to what is being viewed or to create experiences that heighten the mood of what is being viewed.

One way to enhance the viewing experience is to create experiences similar to what is being viewed. For example, if the movie shows a scene going from light to dark in a sunset sequence, the lights within the viewing location may dim or curtains may close. The system could turn on a fog machine if the scene appeared foggy; shake the viewer's seat if the scene depicted an earthquake or avalanche; turn on a fireplace if the scene depicted a room with a fireplace; lower the temperature in the room if the scene was in the Antarctic or in a meat locker; raise the temperature in the room if the scene was in a tropical climate or near a fire; brighten the room lights if the scene is shown in the sun; activate a water feature if a river appears in the scene, and the like. Also, if the system recognizes a picture of a phone, the viewer's phone would ring, or if the scene shows somebody at the door, the doorbell at the viewing location may sound. Other noises, such as barking dogs, whistles, etc., may be taken from prerecorded sounds that are on a viewer's smartphone device that plays sounds that are personal to the user. Using sounds or experiences familiar to the user, such as a doorbell ring, phone ring, phone alarm, the cry of the viewer's baby, the bark of the viewer's dog, and the like, may produce a particularly heightened response while viewing content.

Another way to enhance the viewing experience is to create experiences that heighten the mood of what is being viewed. For example, to enhance the experience of a party, the temperature of the room may be increased, lighting turned up, and floral aromas released. For a horror movie the experience of being frightened may be heightened by lowering the room temperature, turning small noises on randomly around the room, and darkening the room. The viewing experience may also be heightened by introducing effects intending to startle viewers, for example by ringing a doorbell during an extended silent part of the content, turning on or off outside lights, flashing strobe lights or ringing the viewer's phone. Other startling effects played during particularly suspenseful times in the movie may include a snapping or cracking through a special effects machine, a sound through an alarm system, the sound of barking dogs, the whirring of a blender, a vibration or shock being sent through the viewer's chair, or part of the sound or dialogue of the movie played through the viewer's personal mobile device. In another example, a viewer's cell phone may output a "bang" sound when a scene shows a gun that is drawn and about to be fired.

In some embodiments, the output consisting of the content stream along with the synchronized integrated enhanced sensory experiences is streamed in real time. In other embodiments, the output is sent to an integrated enhanced sensory experiences for a content stream database 40 where the output is stored for later presentation.

The determine commands to be sent to devices module 46 receives the content stream that includes the synchronized integrated enhanced sensing experiences, and translates these experiences into specific commands to be sent to devices over network 12 at the viewing location, or to devices over network 14 that are personal to the viewer.

Module 46, in one or more embodiments, queries the viewing location devices database 42 and the personal viewer device database 44 to get the addresses, activation commands, capability, and type of effect for each identified device which can be used to enhance the user's viewing experience. The database 42 which contains the viewing location devices can be obtained or organized by a number of different techniques. In one embodiment, the home may have a computer-controlled HVAC system as well as a computer-controlled lighting system which monitors and controls all the lights in the house. The module 46 to determine devices to be driven can be plugged into the home computer, and the home computer queried to determine which devices in the local environment it controls. For a home which includes a highly sophisticated computer control network, the central computer may be connected to a number of appliances, including refrigerators, ovens, blenders, fans, as well as to the lights, the garage door opener, the windows (whether to open or close them), the blinds on the windows, vacuum cleaners, as well as a number of other products and appliances in the home.

Another source of the database for viewing location devices is the subscriber information with the cable network. For example, when a user signs up for cable TV, satellite TV, or other services, they are almost always required to provide a phone number at which they can be contacted and also provide a phone number through which data information can be shared as part of the cable TV system; for example, making payments on a pay-per-view movie, ordering certain video content, or the like. In addition, the subscriber to a cable TV system, satellite TV system or the like, frequently provides an Internet address and a home address. This information is all part of the subscriber database which is available to the content provider 2, the communication network, the content receiver 8, or other components in the system. The viewing location database will therefore have in it the phone number which the subscriber provided when they signed up for the system, along with a large amount of additional data. This phone number can be used to be the phone number which is rung when a signal comes forward during a film.

Another technique for assembling the viewer database 42 may be to provide queries to the user at a particular location. When the system is being set up at a user location, the software may query to the user the identity of any electronic control systems, computers, telephones, or other environmental control systems in the home or viewing area. The user can input this data to the content receiver 8 or the viewing experience enhancer 10 in order to populate the viewing location database 42. It may also connect an Internet connection to the viewing experience enhancer 10 which has access to the computer in the home as well as access to any telephone lines, security systems, or the like. For example, the viewing location database 42 may be coupled to a computer which is connected to and controls the security system for the home. When the movie reaches a location in which an intruder breaks into the home, the viewing experience enhancer 10 will send a signal to the security system of the home to output an alarm that corresponds to that which would be provided if an intruder broke into the home at that moment, which may include such responses as a flashing light, a loud bell ringing, a telephone call to various locations, turning off all lights in the home, or any other type of response that a security system might make when an intruder has been sensed to have broken into the home.

Module 46 then matches the desired enhanced sensory effect with the command needed to activate the appropriate device to provide that effect. In some embodiments, if the content is being presented in real time, module 46 will use heuristics to determine when a command should be sent to what device for the effect of that device to be properly synced with the content. In other embodiments, module 46 is able to look ahead to the enhanced sensory experience cues in the content and time each device command so that it synchronizes with the content presentation. In some embodiments this look ahead may be the length of the delay of the content, in the order of 5 to 30 seconds. In other embodiments, the module may look ahead through the entire content.

The synchronized commands are then sent to the send commands module 48, where commands to devices at the viewing location are sent through the location network 12, and the commands to devices personal to a viewer are sent through the viewers personal communication network 14. Commands to devices sent through the location network in some embodiments may include commands to devices controlled through Wi-Fi, Bluetooth, RF4CE, ZigBee, HomePlug, DNLA, and the like. Commands to devices sent through the viewer's personal communication network may include commands to devices controlled through Wi-Fi, cell phone provider networks, or other proprietary networks. In one or more embodiments, the viewers at the location are able to enable or disable devices used to create an enhanced viewing experience.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a receiving device, a content stream including at least one of audio and video content;
providing the content stream for presentation on a primary device;
analyzing the content stream to identify enhanced sensory experience content corresponding with a portion of the content stream;
determining an enhanced sensory experience effect associated with the identified enhanced sensory experience content;
accessing a viewing location devices database to identify addresses of, commands to be used to communicate with and enhanced sensory experience capabilities of one or more secondary devices, wherein the commands are used to activate, operate and deactivate the one or more secondary devices;
identifying a secondary device among the one or more secondary devices capable of providing the determined enhanced sensory experience effect; and
activating the identified secondary device to provide the identified enhanced sensory experience effect in synchronization with the presentation of the corresponding portion of the content stream on the primary device.

2. The method of claim 1 wherein analyzing the content stream to identify enhanced sensory experience content includes:
analyzing metadata within the content stream.

3. The method of claim 1 wherein analyzing the content stream to identify enhanced sensory experience content includes:
analyzing closed caption and other text within the content stream.

4. The method of claim 1 wherein analyzing the content stream to identify enhanced sensory experience content includes:
analyzing video content within the content stream.

5. The method of claim 1 wherein analyzing the content stream to identify enhanced sensory experience content includes:
analyzing audio content within the content stream.

6. The method of claim 1 wherein analyzing the content stream to identify enhanced sensory experience content includes:
displaying the content stream on the primary device; and
analyzing the content stream substantially simultaneously with the displaying of the content stream.

7. The method of claim 1 wherein analyzing the content stream to identify enhanced sensory experience content includes:
analyzing the content stream before displaying the content stream on the primary device; and
displaying the content stream on the primary device.

8. The method of claim 1, further comprising:
determining a second enhanced sensory experience effect associated with the identified enhanced sensory experience content;
identifying another secondary device among the one or more secondary devices capable of providing the determined second enhanced sensory experience effect; and
activating the identified another secondary device to provide the identified second enhanced sensory experience effect in synchronization with the presentation of the corresponding portion of the content stream on the primary device.

9. A receiving device, comprising:
a content analysis module configured to analyze a received a content stream including at least one of audio and video content and identify enhanced sensory experience content corresponding with a portion of the content stream; and
an enhanced sensory experience module configured to:
provide the content stream to a primary device for presentation;
determine an enhanced sensory experience effect associated with the identified enhanced sensory experience content;
access a viewing location devices database to identify addresses of, commands to be used to communicate with and enhanced sensory experience capabilities of one or more secondary devices, wherein the commands are used to activate, operate and deactivate the one or more secondary devices;
identify a secondary device among the one or more secondary devices capable of providing the determined enhanced sensory experience effect; and
activate the identified secondary device to provide the identified enhanced sensory experience effect in synchronization with the presentation of the corresponding portion of the content stream on the primary device.

10. The receiving device of claim 9 wherein the primary device is a television, and the receiving device is included within the primary device.

11. The receiving device of claim 9 wherein the receiving device comprises a set top box.

12. The receiving device of claim 9 wherein the viewing location devices database is stored in the receiving device.

13. The receiving device of claim 9 wherein the content analysis module includes a text analysis module configured to receive the content stream, and to decode and analyze at least one of closed-caption text, on-screen text, titles, and other text contained within the content stream to identify the enhanced sensory experience content corresponding with a portion of the content stream.

14. The receiving device of claim 9 wherein the content analysis module includes a video analysis module configured to receive the content stream, and to analyze video content within the content stream to identify the enhanced sensory experience content corresponding with a portion of the content stream.

15. The receiving device of claim 9 wherein the content analysis module includes an audio analysis module configured to receive the content stream, and to analyze audio content within the content stream to identify the enhanced sensory experience content corresponding with a portion of the content stream.

16. A non-transitory computer-readable storage medium containing instructions that, when executed by a processor of a receiving device, cause the receiving device to:
receive a content stream including at least one of audio and video content;
provide the content stream for presentation on a primary device;
analyze the content stream to identify enhanced sensory experience content corresponding with a portion of the content stream;
determine an enhanced sensory experience effect associated with the identified enhanced sensory experience content;
access a viewing location devices database to identify addresses of, commands to be used to communicate with and enhanced sensory experience capabilities of one or more secondary devices, wherein the commands are used to activate, operate and deactivate the one or more secondary devices;
identify a secondary device among the one or more secondary devices capable of providing the determined enhanced sensory experience effect; and
activate the identified secondary device to provide the identified enhanced sensory experience effect in synchronization with the presentation of the corresponding portion of the content stream on the primary device.

17. The non-transitory computer-readable storage medium of claim 16 wherein the instructions cause the receiving device to analyze the content stream at least in part by decoding and analyzing at least one of closed-caption text, on-screen text, titles, and other text contained within the content stream to identify the enhanced sensory experience content corresponding with a portion of the content stream.

18. The non-transitory computer-readable storage medium of claim 16 wherein the instructions cause the receiving device to analyze the content stream by analyzing at least one of video content and audio content within the content stream to identify the enhanced sensory experience content corresponding with a portion of the content stream.

19. The non-transitory computer-readable storage medium of claim 16 wherein the instructions, when executed by the processor of the receiving device, further cause the receiving device to:
- determine a second enhanced sensory experience effect associated with the identified enhanced sensory experience content;
- identify another secondary device among the one or more secondary devices capable of providing the determined second enhanced sensory experience effect; and
- activate the identified another secondary device to provide the identified second enhanced sensory experience effect in synchronization with the presentation of the corresponding portion of the content stream on the primary device.

20. The non-transitory computer-readable storage medium of claim 16 wherein the instructions cause the receiving device to analyze the content stream to identify the enhanced sensory experience content before the content stream is presented on the primary device.

\* \* \* \* \*